United States Patent [19]

Lazar

[11] 4,250,626
[45] Feb. 17, 1981

[54] ELECTRONIC COMPASS

[76] Inventor: Harold Lazar, 3001 Via Buena, Palos Verdes Estates, Calif. 90274

[21] Appl. No.: 68,194

[22] Filed: Aug. 20, 1979

[51] Int. Cl.³ ............................................... G01C 17/04
[52] U.S. Cl. ............................... 33/363 R; 33/355 R; 33/361
[58] Field of Search ............. 33/363 R, 363 Q, 363 L, 33/355, 361, 362, 357, 358, 359

[56] References Cited

U.S. PATENT DOCUMENTS

| | | | |
|---|---|---|---|
| 2,286,406 | 6/1942 | Green et al. | 33/363 L |
| 2,662,208 | 12/1953 | Wells | 33/363 R |
| 2,755,562 | 7/1956 | Hurlburt | 33/363 R |
| 3,959,889 | 6/1976 | Thomas | 33/363 R |

Primary Examiner—William D. Martin, Jr.
Attorney, Agent, or Firm—I. Michael Bak-Boychuk

[57] ABSTRACT

Set out herein is an electronic compass suitable for public use having a conventional pin supported magnetic needle which is placed over a set of magneto diodes or Hall devices arranged in quadrature. The magneto diodes or Hall devices are thus exposed to the highly enhanced magnetic field around the needle and will thus provide a direct readout, in electrical form, of the deviation from magnetic North. In this manner a relatively conventional arrangement of a magnetic needle may be utilized to provide the necessary signal source for electronic pick-off with the same accuracy obtained by a conventionally suspended arrangement practiced in the past.

2 Claims, 5 Drawing Figures

ELECTRONIC COMPASS

BACKGROUND OF THE INVENTION

1. Field of the Invention

The present invention relates to navigation devices, and more particularly to a signal pick-off arrangement for detecting the alignments of a magnetic needle.

2. Description of the Prior Art

Electronic compasses have had great revivals in recent popularity, particularly since the advant of inexpensive digital displays. While elegant in their displays such electronic compasses utilize the earth's magnetic field as the reference and are therefore not much more accurate than a good magnetic compass. Thus an electronic or a magnetic compass are both inherently of lower accuracy, an accuracy acceptable for the lay person in his ordinary endeavors of navigating a small boat or some other vehicle. In the most basic form, a magnetic compass includes the use of a magnetized needle typically suspended on a pin for minimal friction losses, where the needle seeks alignment with the local earth magnetic flux. This needle then travels above the surface of a dial which is inscribed with the necessary markings for determining the alignment thereof relative the axis of the vehicle. In order to isolate the roll and pitch motions of the vehicle from the plane of the needle, quite often gimballed arrangements are utilized comprising a roll and pitch gimbal axis and a bob weight. In this form a relatively inexpensive instrument is now commonly available which because of the number produced is now realizable to a relatively high accuracy at minimal cost.

An electronic compass utilizes what is known as the Hall effect where semiconductor devices are fixed to a hard platform referenced to the vehicle. This Hall effect semiconductor then sends the local earth magnetic field to produce the sine and cosine components thereof for readout. In exemplary electronic compass of such type is that disclosed in U.S. Pat. No. 4,030,204. In each instance where flux sensors are utilized, the earth's magnetic flux is directly sensed with a consequently large error because of the weakness thereof. Thus electronic compasses of the foregoing kind, while more rugged and less mechanically complex, are also less accurate. A magnetic needle when properly damped by fluid is still one of the more accurate sensing devices and when properly constructed and installed is still the most prevalent device publicly used.

SUMMARY OF THE INVENTION

Accordingly, it is the general purpose and object of the present invention to provide an inexpensive electronic readout for the alignment of a magnetic needle.

Other objects of the invention are to utilize the enhanced magnetic field around a magnetic needle for providing the signal pick off to produce an electrical readout.

Yet additional objects of the invention are to produce an electronic compass which by virtue of its structure has all of the physical reliability of a conventional magnetic needle and which by virtue of the output thereof may be used in various other implementations such as navigational computers.

Briefly these and other objects are accomplished within the present invention by providing an arrangement of permanent magnets conventionally supported as in a magnetic needle for alignment with the local earth's magnetic flux, the magnet needle being deployed over a surface on which four orthogonally aligned magneto diodes or Hall devices are placed. The result achieved is that the substantially stronger magnetic field around the magnets themselves may be utilized to provide a signal for pickoff which is then picked off by the magneto diodes or Hall devices in quadrature. The diodes or Hall devices are then arranged in an electrical network to produce signals that are proportional to the sine and cosine of the vehicle heading relative to magnetic North. These signals may be applied to a conventional differential amplifier for isolation. The amplifier may then drive any conventional analog to digital device which will thus produce the necessary digitizing of the signal for digital display.

The foregoing implementation takes benefit of the substantially stronger magnetic field surrounding the permanent magnets that are used as a compass needle. More specifically, it has been found that the local magnetic field around a typical arrangement of permanent magnets aligned as a compass needle is one hundred to two hundred times stronger than the magnetic field of the earth at its surface. This then provides an immediate amplification approximately one hundred to two hundred times which may be used by conventional sensing devices like magneto diodes or Hall devices to resolve the signal. Thus all of the inexpensive aspects of supporting a magnet needle are used to generate the basic signal source and the inherent characteristics of the needle are utilized to strengthen the pickoff. In this form compensation may be conveniently achieved by electrical adjustment, particularly since the very accurate digital readout is available to compare against the reference.

DESCRIPTION OF THE SPECIFIC EMBODIMENT

Figure 1:
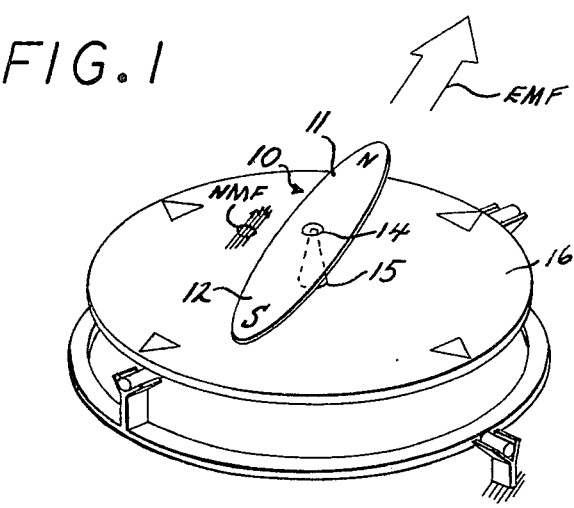
FIG. 1 is a perspective illustration of a conventional magnetic needle deployed over a dial, including the illustration of the magnetic flux incident thereto.

As shown in FIG. 1 a magnetic needle generally designated by the numeral 10 in typical form comprises a magnetic dipole having a North segment 11 and a South segment 12 joined at a pivot 14 which is supported on a vertically aligned needle 15. This needle 15 extends from a dial 16 which may be conventionally gimballed along the roll and the pitch axis of the vehicle supporting the instrument. The foregoing describes in the most nominal terms the present-day implementation of a magnetic compass. The resulting instrument is quite accurate, particularly when properly adjusted, needle 10 aligning with substantial accuracy with the local earth magnetic field shown herein by the arrow EMF. As is characteristic of all magnetic dipoles, a magnetic flux is created thereabout shown herein as the magnetic flux NMF of the needle 10. More specifically, the flux density of the local flux NMF, even with the more basic implementations of the needle 10 is approximately one hundred times stronger or denser than the flux density of the earth's magnetic field EMF. Thus immediately adjacent the needle flux fields at least one hundred times stronger than those of the earth's field are available. Furthermore, the magnetic coercive force in the vicinity of the needle 10 is also about one hundred times stronger than the magnetic coercive force provided by the earth's magnetic field at its surface.

Figure 2:
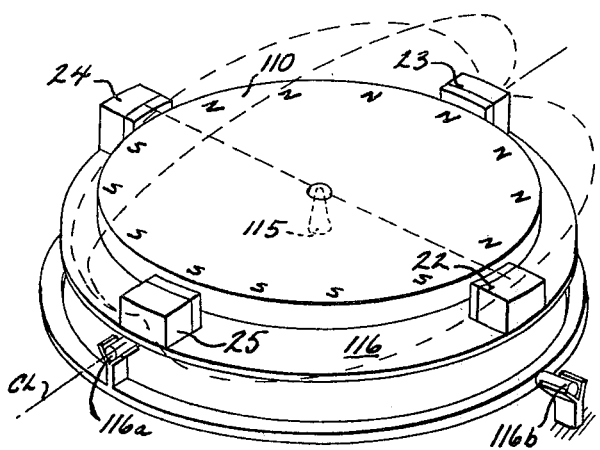
FIG. 2 is another perspective illustration of a short cylindrical permanent magnet balanced on a pivot together with a schematic representation of the magnetic flux sensed by magneto diodes.

Utilizing this effect, in FIG. 2 this coercive force is represented by the elemental North (N) and south (S) dipoles that are distributed on the rim of a permanent magnet disc 110 that is magnetized as a rotor, and suspended on a pivot 115 extending from a base 116. Four magneto diodes 22, 23, 24 and 25 are fixed to the same base 116 at quadrant locations relative the pivot 115. This surface is maintained horizontal, once more, by a pair of conventional gimbals 116(a) and 116(b) and is aligned so that its axis marked CL is parallel to the roll axis of the vehicle. To provide optimum pick-off strength the magneto diodes are aligned in close proximity to the disc 110 and thus respond to the local coercive force generated thereby. Each of the diodes 22–25 possess the characteristics described in the publication entitled "Sony Magneto Diode" and available from Shigma, Inc., P.O. Box 71, 1550 Northwest Highway, Parkridge, Ill. 60068.

Figure 4:
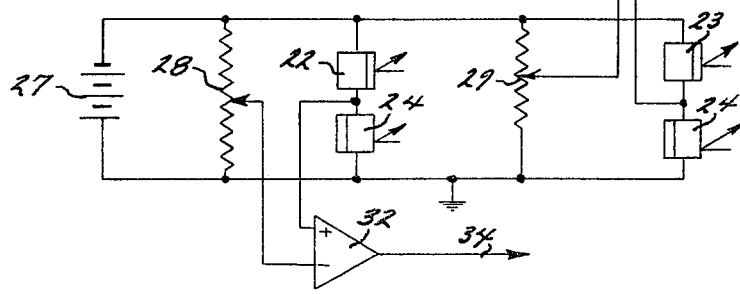
FIG. 4 is an electrical schematic of a bridge network connected to the foregoing magneto diodes shown in FIG. 2 for resolving the alignment of the magnetic field.

By arranging diodes 22–25 in a bridge network as that shown in FIG. 4, the bridge unbalance will produce a resolved output signal which in electrical form corresponds to the vehicle deviation from the local magnetic North. It is to be understood that diodes 22–25, according to its manufacturer, are linear to approximately five hundred Oerstead field levels, field levels which are comfortably achieved by selecting the appropriate magnetic material for the magnet 15. Thus substantially linear response characteristics are readily achieved by appropriate selection of the magnetic dipole strength and the deployment of the diodes. In the bridge network itself diodes 22 and 23 extend from the positive terminal of a battery 27, diode 22 joining diode 24 at one side of the bridge balance terminal. Similarly diode 23 joins diode 25 at the other side of bridge balance. Deployed across the bridge are two variable resistors 28 and 29 having a common terminal shorted to ground. Thus adjustment of the bridge level can be conveniently made by way of the adjustment of resistors 28 and 29 producing a bridge balance point at whatever level desired. The bridge unbalance signals are fed to two operational amplifiers 31 and 32 connected as differential amplifiers which then produces output signals 33 and 34 which may be converted to digital form by an analog to digital converter. This digitized signal may then be fed to a display or counter for further process.

Figure 3:
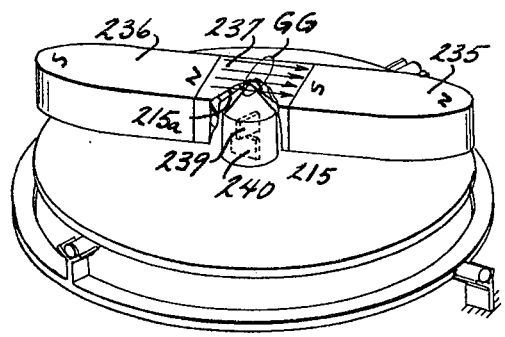
FIG. 3 is yet another perspective illustration of a pair of rectangular magnets separated by a non-magnetic rectangular solid balanced on a pivot point to rotate about the local vertical, together with a schematic representation of the magnetic flux sensed by Hall devices.

The magnetic dual of the arrangement of FIG. 2 is shown in FIG. 3. This arrangement is appropriate when Hall devices are used instead of magneto diodes. Herein two rectangular permanent magnets 235 and 236 are separated by a non-magnetic solid material 237. A pointed pivot post 215 is inserted in a pivot hole 215a in the non-magnetic solid 237. The pivot post 215 is enlarged to contain two orthogonally aligned Hall devices 239 and 240. The magnetic flux lines outside of the arrangement of magnets, shown as a collection of arrows FF, will create a magnetic dipole moment that will tend to align the magnets 235 and 236 parallel to the earth's magnetic field. The magnetic flux lines through the non-magnetic stratum 237 between the two magnets 235 and 236, shown as the collection of arrows GG, will provide a magnetic flux density many times that of the earth's magnetic field which may then be sensed by the Hall devices.

Figure 5:
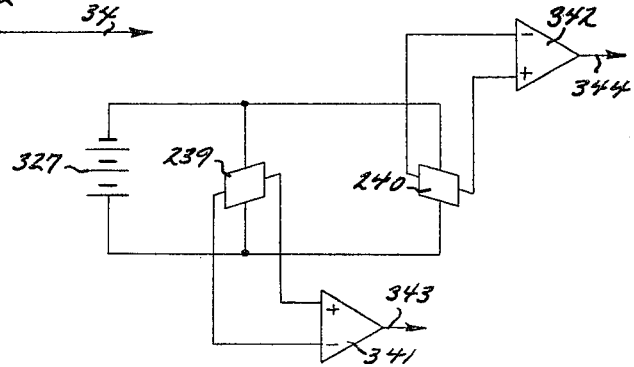
FIG. 5 is yet another schematic illustration of electrical circuit used with the Hall devices shown in FIG. 3.

By arranging the Hall devices 239 and 240 once more in a bridge network as shown in FIG. 5 the bridge unbalance will produce an output signal which in electrical form corresponds to the vehicle deviation from the local magnetic North. It is to be understood that the Hall devices 239 and 240, according to various manufacturers, are linear in the presence of magnetic fields ranging from one Gauss to several thousand Gausses. Thus substantially linear response characteristics are readily achieved, again, by appropriate selection of the magnetic characteristics of the permanent magnets in FIG. 3. In the bridge network of FIG. 5 the Hall devices are provided with a bias current from battery 327. The signal output of each Hall device is then fed differentially to operational amplifiers 341 and 342. The outputs of the operational amplifiers 341 and 342 are then proportional to the sine and the cosine of the vehicle magnetic deviation from magnetic North.

While the implementation of the output of the bridge balance may be variously utilized the basic readout is both inherently stable and linear over the full range of the magnetic compass. In this form implementation of the signal into bit format acceptable for any navigational computer may be possible, further expanding the utility of the device set out herein.

Obviously many modifications and changes may be made to the foregoing description without departing from the spirit of the invention. It is therefore intended that the scope of the invention be determined solely on the claims appended hereto.

What is claimed is:

1. A compass adapted to produce electrical signals indicative of the local magnetic North, comprising:
   a permanent magnet dish magnetized as a rotor suspended for rotary alignment with the local magnetic North and said dish including a magnetic flux field proximate thereto;
   a plurality of magneto diodes mounted adjacent said dish for sensing said magnetic flux alignment in the proximity thereof; and
   electrical resolving means connected in circuit with said magneto diodes for producing electrical signals indicative of the alignment of said magnetic flux relative said compass.

2. Apparatus according to claim 1 wherein:
   said magneto diodes are aligned in quadrature relative each other.

* * * * *